(No Model.) 2 Sheets—Sheet 1.
R. W. HARDIE.
LEVER.
No. 398,152. Patented Feb. 19, 1889.
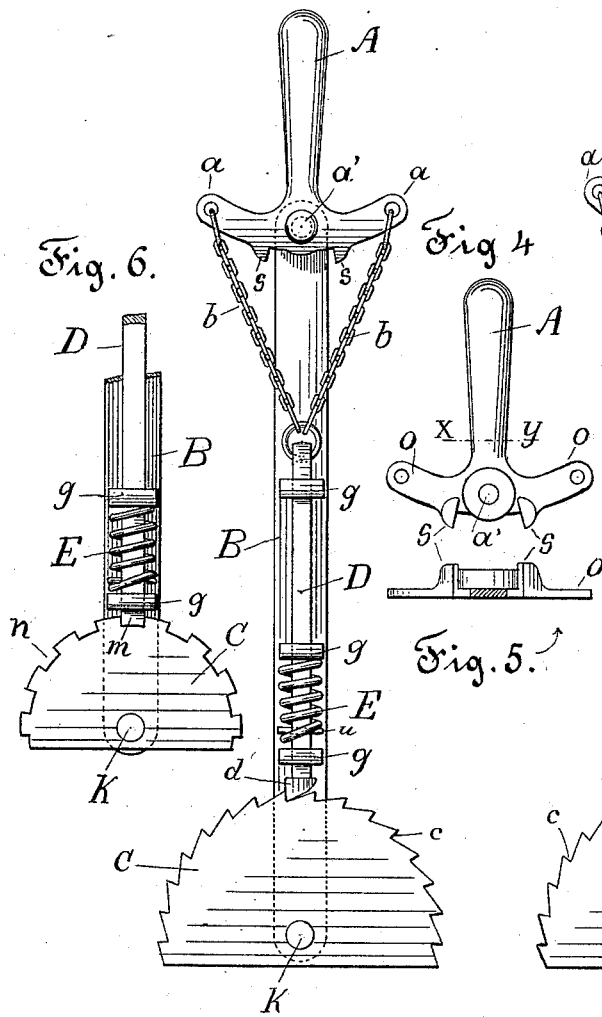
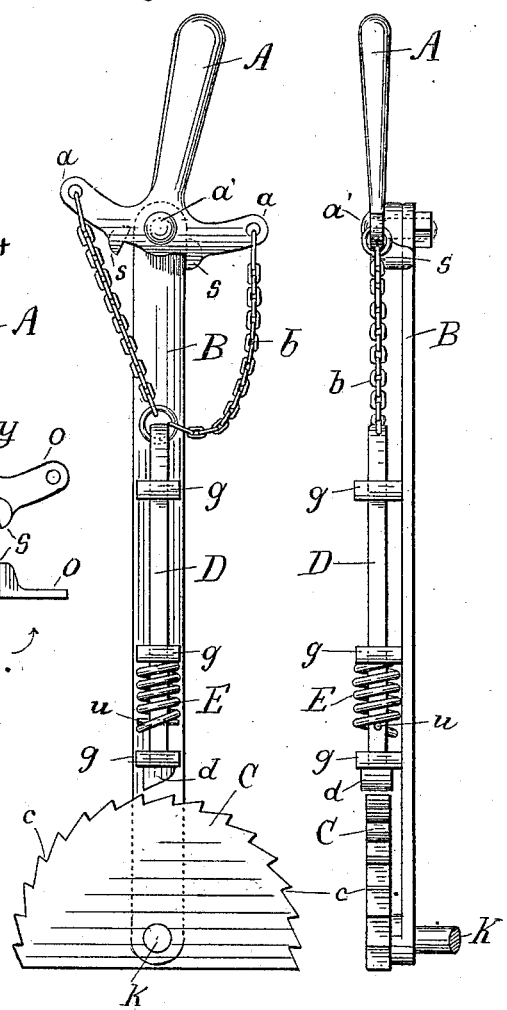
WITNESSES:
Walter Mullins
Fred. J. Lawrence
INVENTOR,
Robert W. Hardie (No Model.) 2 Sheets—Sheet 2.

R. W. HARDIE.
LEVER.

No. 398,152. Patented Feb. 19, 1889.

WITNESSES:

INVENTOR,
Robert W. Hardie

UNITED STATES PATENT OFFICE.

ROBERT W. HARDIE, OF ALBANY, NEW YORK.

LEVER.

SPECIFICATION forming part of Letters Patent No. 398,152, dated February 19, 1889.

Application filed August 30, 1888. Serial No. 284,186. (No model.)

*To all whom it may concern:*

Be it known that I, ROBERT W. HARDIE, a citizen of the United States, residing at Albany, in the county of Albany and State of New York, have invented certain new and useful Improvements in Levers, of which the following is a specification.

My invention relates, generally, to levers having a latch and sector connected therewith.

The object of my invention is to provide a lever with a handle which will raise a latch and move the lever either forward or backward by a movement of the handle in one direction. This I accomplish by providing a pivoted bar having a latch connected thereto with a handle pivoted to said bar and movable on its pivot independently of said bar, and, further, by providing the handle and latch with means adapted to co-operate with each other in such a manner that when the handle is moved on its pivot it will raise the latch, and, further, by providing stops adapted to limit the independent movement of the handle on its pivot, so that the bar may be moved by the handle either forward or backward.

Figure 7:
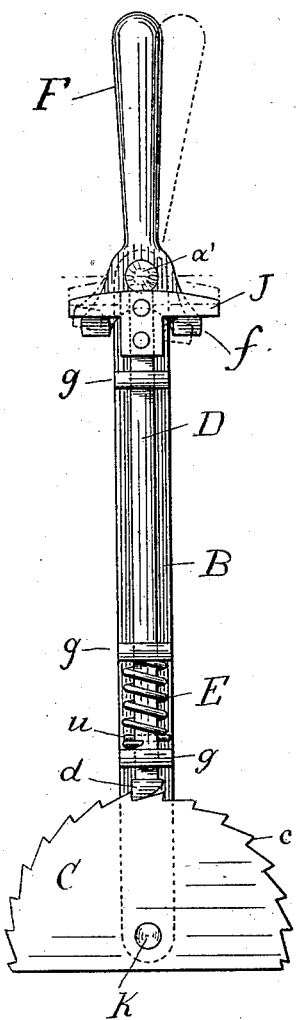
Figure 9:
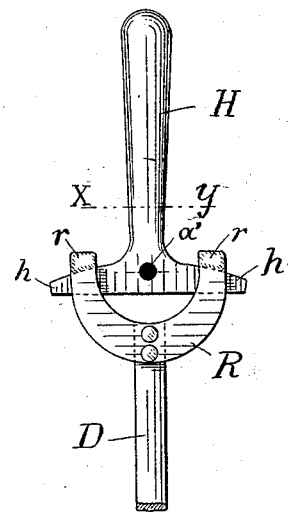
Figure 8:
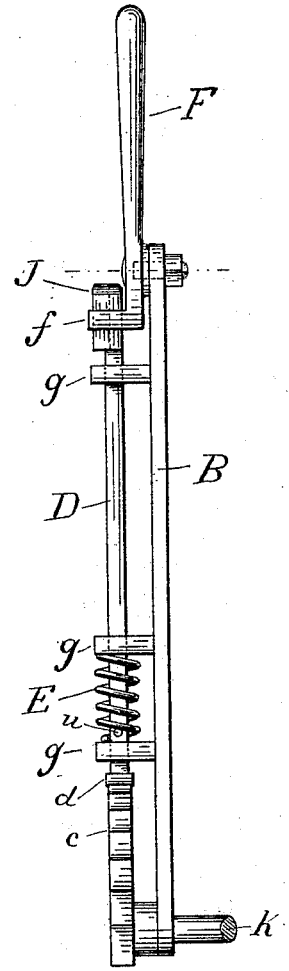
Figure 10:
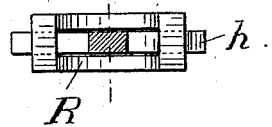

In the drawings, Figure 1 represents a sector, a pivoted bar connected with the sector, a spring-actuated latch connected with the pivoted bar, and a handle provided with stops pivoted to the bar, and loose jointed or flexible connections uniting the latch with the handle. Fig. 2 represents the parts shown in Fig. 1 as they appear when the latch is raised by the handle and the independent movement of the handle limited by the stops. Fig. 3 represents a side view of the parts shown in Fig. 1. Fig. 4 represents a front view of the handle shown in Fig. 1 detached from the pivoted bar. Fig. 5 represents a plan view of the handle shown in Fig. 4, taken on line *x y* of Fig. 4. Fig. 6 represents a sector having a modified form of notch with a portion of a pivoted bar and latch. Fig. 7 represents a sector, a pivoted bar, a spring-actuated latch, a handle pivoted to the bar and provided with stops, and a modification of means for connecting the handle and latch. Fig. 8 shows a side view of the parts shown in Fig. 7. Fig. 9 shows a front view of modification of handle and end of latch-rod. Fig. 10 shows top view of the same, taken through line *x y* of Fig. 9.

B represents a bar movable upon a pivot, K. Connected with the bar is a latch, D, and a spring, E, for throwing the latch into engagement with the notches of a sector. The latch may be made to move in ways of any suitable construction—such, for instance, as the guides *g*—attached to the bar. The construction of these guides may be varied, however, and even ordinary staples may be used. Instead of a latch-rod, D, shown herein, a chain or other device may be used having capabilities similar to the rod. Connected with the pivoted bar is a sector, C, provided with notches *c*, adapted to engage with a latch. The shape of these notches may be varied. I prefer to use a notch represented by *n* in Fig. 6, which has the inner walls of the notch nearly or quite parallel.

A represents a handle attached to the bar B by means of a pivot, *a'*, and movable on said pivot in the same direction as the bar and independently thereof. This independent movement of the handle on its pivot is limited by means of stops of any suitable construction—such, for instance, as are represented by *s* in Figs. 1 and 2.

I do not limit myself to the exact constructions of the stops shown herein. The shoulder *d* of the latch D, coming in contact with the under surface of the guide *g*, may serve as a stop to limit the movement of the handle on its pivot. A stop of any other construction which will limit the independent movement of the handle in the same direction as the bar is included in my invention. The pivoted handle is shown in the drawings provided with arms extending from the lower portion of the handle outward in an opposite direction from each other. These extending arms may be connected with the latch by means of chains *b* or similar loose-jointed or flexible connections.

The connections between the arms of the handle and the latch may be varied without departing from my invention. The latch may be provided with a straight cross-arm, J, (shown in Fig. 7,) or a yoke, R, (shown in Fig. 9,) constructed so as to connect and engage the arms of the handle with the latch.

In the construction shown in Fig. 7 the lugs $f$ serve as stops to limit the independent movement of the handle, and also as means for lifting the latch.

I claim—

1. The combination, with a notched sector, of a pivoted bar, a longitudinally-movable spring-actuated latch, a handle pivoted to said bar, movable independently in the same plane as the bar or in a parallel plane, limited in said independent movement by means of stops, and provided with arms extending in opposite directions, and connections between said arms and the aforesaid latch, substantially as shown and described.

2. The combination, with a notched sector, of a pivoted bar, a longitudinally-movable spring-actuated latch, a handle provided with offsets adapted to serve as stops, and with arms extending in opposite directions, said handle being movable independently on its pivot in the same plane as the bar or in a parallel plane, and connections between said arms of the handle and the aforesaid latch, substantially as shown and described.

3. The combination, with a notched sector, of a pivoted bar, a longitudinally-movable spring-actuated latch, a handle pivoted to said bar, movable independently in the same plane as the bar or in a parallel plane, limited in said independent movement by means of stops, and provided with arms extending in opposite directions, and flexible connections between said arms and the aforesaid latch, substantially as shown and described.

ROBERT W. HARDIE.

Witnesses:
   SCOTT D. M. GOODWIN,
   LEWIS H. PHILO.